United States Patent [19]

Chiocca, Jr.

[11] Patent Number: 5,027,426

[45] Date of Patent: Jun. 25, 1991

[54] SIGNAL COUPLING DEVICE AND SYSTEM

[76] Inventor: Joseph J. Chiocca, Jr., 9948 Goshawk Ct., Jacksonville, Fla. 32257

[21] Appl. No.: 376,520

[22] Filed: Jul. 7, 1989

[51] Int. Cl.⁵ .......................................... H04H 1/00
[52] U.S. Cl. ...................................... 455/5; 455/6; 455/74; 358/85; 358/86
[58] Field of Search ................................. 455/4–6, 455/131, 74; 358/84–86; 379/90, 64–65, 53, 101; 333/129, 132; 340/310 R; 307/529, 428

[56] References Cited

U.S. PATENT DOCUMENTS

| | | | |
|---|---|---|---|
| 3,385,974 | 5/1968 | Rockwell | 307/72 |
| 3,860,757 | 1/1975 | Stewart | 370/72 |
| 3,944,755 | 3/1976 | Takahashi et al. | 333/132 |
| 4,008,369 | 2/1977 | Theurer et al. | 358/85 |
| 4,397,037 | 8/1983 | Theriault | 333/132 |
| 4,450,481 | 5/1984 | Dickinson | 358/114 |
| 4,456,925 | 6/1984 | Skerlos et al. | 358/85 |
| 4,586,081 | 4/1986 | St. Arnaud et al. | 358/121 |
| 4,603,349 | 7/1986 | Robbins | 358/86 |
| 4,606,072 | 8/1986 | Martin et al. | 358/86 |
| 4,621,285 | 11/1986 | Schilling et al. | 358/120 |
| 4,700,386 | 10/1987 | Kohn | 380/10 |
| 4,852,154 | 7/1989 | Lewis et al. | 358/86 |
| 4,890,320 | 12/1989 | Monslow et al. | 358/85 |
| 4,890,322 | 12/1989 | Russell, Jr. | 358/86 |
| 4,910,767 | 3/1990 | Brugliera et al. | 358/86 |

Primary Examiner—Reinhard J. Eisenzopf
Assistant Examiner—Andrew Faile
Attorney, Agent, or Firm—Finnegan, Henderson, Farabow, Garrett & Dunner

[57] ABSTRACT

Signal coupling apparatus for combining CATV and telephone signals onto a single cable for transmission to an impulse pay-per-view converter device. The apparatus includes a bidirectional CATV signal port, a bidirectional telephone signal port, and a bidirectional composite signal port for transmitting and receiving composite signals including telephone and CATV signals. The apparatus further includes a circuit having a first isolating portion for isolating the CATV signal port from telephone signals present on the telephone and composite signal ports, and a second isolating portion for isolating the telephone signal port from CATV signals present on the CATV and composite signal ports.

27 Claims, 3 Drawing Sheets

SIGNAL COUPLING DEVICE AND SYSTEM

The present invention is directed in general to signal conditioning circuits and, more particularly, to signal coupling apparatus and system for application in CATV systems.

BACKGROUND OF THE INVENTION

Cable television (CATV) service providers have in the recent past been offering pay-per-view (p-p-v) services. In contrast to conventional CATV service in which the viewer receives a set of CATV channels for a fixed monthly rate, the p-p-v service consists of the user receiving a single viewing of a pay-per-view feature at a predetermined time and being billed for the single viewing. The p-p-v service is typically provided in conjunction with the conventional CATV service with the p-p-v feature being transmitted for reception on a predetermined channel received with the conventional CATV channels.

In one form of the p-p-v service, p-p-v service circuitry is included, in the viewer's home, either within the conventional CATV reception apparatus or within a physically separate "converter device." In either case, the CATV signals received from the CATV service provider, including the one or more channels designated for carrying p-p-v features, are received by the p-p-v circuitry. The p-p-v circuitry includes circuitry for descrambling a p-p-v feature if the viewer has previously elected to view the feature. In this form of p-p-v service, the viewer corresponds, either by telephone or mail, with the cable service provider to identify the desired p-p-v feature. A central computer located at facilities of the cable service provider transmits a command over the CATV service cable for receipt by the particular p-p-v circuitry of the viewer who elected to view the p-p-v feature. The command causes the p-p-v circuitry to descramble the desired p-p-v feature upon its being broadcast. The ability to command the particular p-p-v circuitry of the viewer is made possible by assigning a unique addressable identity to the respective p-p-v circuits of the viewers served by the cable provider. The nature of the p-p-v circuitry and the manner in which the central computer's command is implemented by that circuitry are known in the art and, not being part of the present invention, are not described in detail herein.

A more recent innovation in the p-p-v service is referred to as an "impulse pay-per-view" service. In accordance with this service, a separate converter device is provided and includes circuitry for descrambling a desired p-p-v feature as well as circuitry for accessing the cable company's central computer via telephone line. Thus, the converter device requires connection to both the CATV cable as well as a telephone line providing access to the viewer's conventional telephone service. An actuating device, e.g., a button, is provided on the converter device for actuation by the viewer to select the desired p-p-v feature for receipt on the viewer's television. In one known implementation of the impulse p-p-v service, the converter device descrambles the desired p-p-v feature, in direct response to the viewer's selection, without intervention by the cable company's central computer. Subsequently, the central computer commands each converter device, by direct addressing over the CATV cable, to make telephone contact with the central computer to log in the p-p-v features selected by the viewer. Converter devices having these capabilities, including the capability of automatically dialing out a predetermined number, are commercially available as models DP5, DPV5 and Starcom 7 manufactured by Jerrold Electronics, Inc., of Hatboro, Pa.

The requirement that the converter device associated with the impulse p-p-v service be connected to both the CATV cable and to the telephone line of the viewer, creates installation difficulties. The major difficulty arises in the situation where there is no telephone service in the particular room in which the converter device is being installed. In that situation, the installer must tap into the telephone line at another location in the viewer's dwelling and route the telephone line to the proximity of the converter box. It may also be necessary for the installer to perform such routing of the telephone line in the case where telephone service is located in the same room as the converter device but at a location remote from the converter device, e.g., across the room. Further, in the situation where multiple converter devices are being installed in different rooms in the viewer's dwelling, it is necessary for the installer to provide telephone service to the proximity of each converter box in each room. The routing of telephone cable to each converter box disadvantageously requires additional installation time. Further, the routed telephone cable may detract from the aesthetic appearance of the viewer's dwelling.

SUMMARY OF THE INVENTION

It is an object of the present invention to provide apparatus for overcoming the above-described installation difficulties associated with impulse p-p-v converter devices.

It is another object of the present invention to provide apparatus for enabling provision of both CATV and telephone service to an impulse p-p-v converter device over a single cable.

Additional objects and advantages of the invention will be set forth in part in the description which follows, and in part will be obvious from the description, or may be learned by practice of the invention. The objects and advantages of the invention may be realized and attained by means of the elements and combinations particularly pointed out in the appended claims.

To achieve the objects and in accordance with the present invention, as embodied and described herein, there is provided signal coupling apparatus, comprising: a bidirectional radio frequency (RF) signal port; a bidirectional telephone signal port; a bidirectional composite signal port for transmitting and receiving composite signals including telephone and RF signals; and bidirectional means, operatively coupled between the RF signal port, telephone signal port and composite signal port, for providing on the composite signal port a composite signal comprising RF and telephone signals respectively present on the RF and telephone signal ports and for respectively providing, on the RF and telephone signal ports, RF and telephone signals that are included in a composite signal present on the composite signal port.

The accompanying drawings which are incorporated in and constitute a part of this specification, illustrate embodiments of the invention and, together with the description, serve to explain the principles of the invention.

DESCRIPTION OF THE PREFERRED EMBODIMENT

Figure 1:
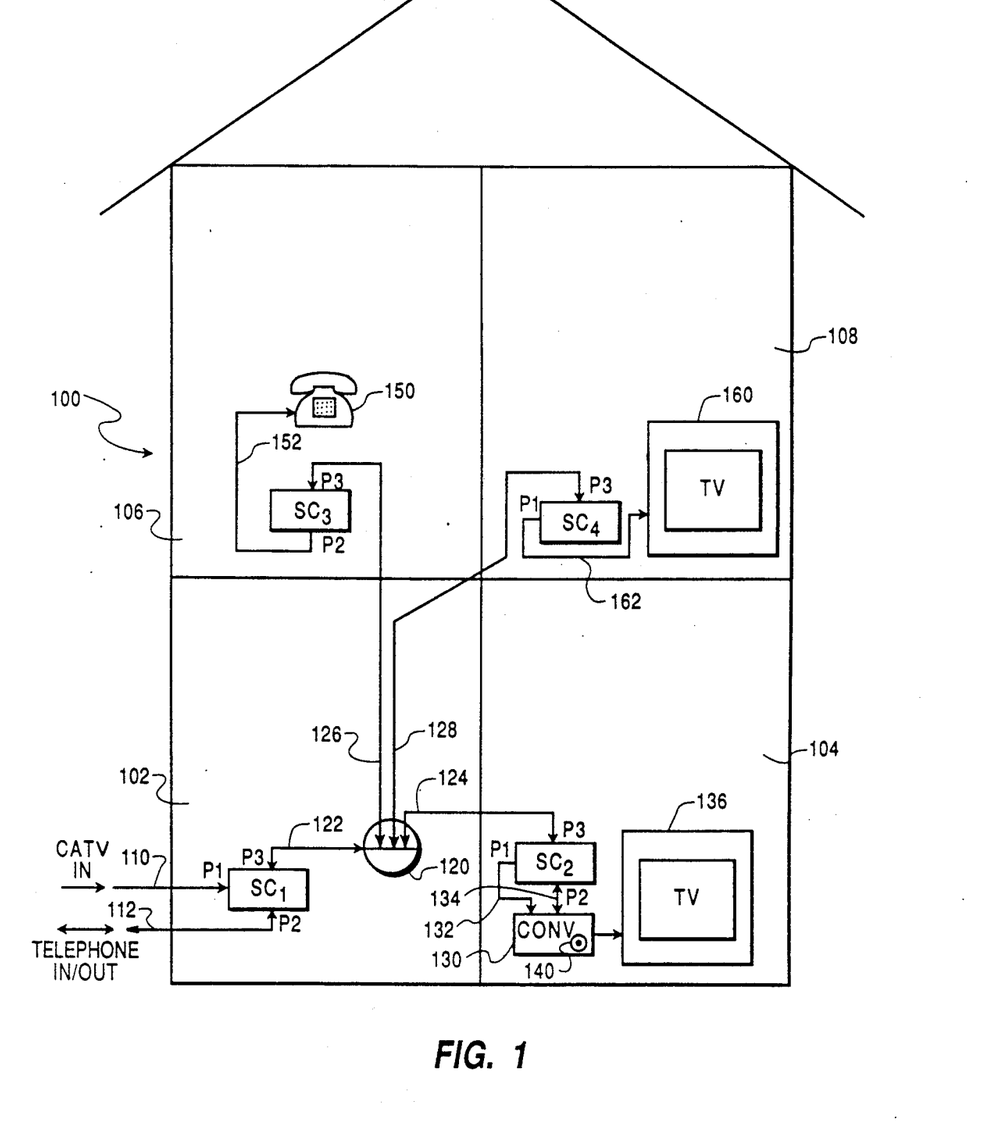
FIG. 1 illustrates a dwelling in which signal coupling devices constructed in accordance with the present invention are utilized.

Referring now to the drawings, FIG. 1 illustrates a dwelling 100 in which signal coupling devices (SC), referred to hereinafter as signal couplers, constructed in accordance with the present invention are utilized. For illustrative purposes only, the dwelling is divided into four areas 102, 104, 106 and 108 in which are respectively installed four substantially identical signal couplers $SC_1$, $SC_2$, $SC_3$ and $SC_4$. Each signal coupler includes television input/output (i/o) port means provided as a bidirectional RF (radio frequency) signal port P1 for transmitting and receiving RF signals such as CATV signals, telephone i/o port means provided as a bidirectional telephone signal port P2 for transmitting and receiving telephone signals, and composite i/o port means provided as a bidirectional composite signal port P3 for transmitting and receiving a composite signal that includes both the RF and telephone signals present on ports P1 and P2, respectively.

Dwelling 100 receives in area 102 an incoming CATV service cable 110 from the company providing CATV service. Cable 110 thus carries RF CATV signals and is typically provided as a 75 ohm coaxial cable. Area 102 is also illustrated as receiving an incoming telephone service cable 112 such as would be provided by the telephone company. Cable 112 thus can carry on its conductors typical bidirectional telephone communication signals and can be provided as a two conductor cable. Cable 112 is indicated as bidirectional to reflect the bidirectional nature of telecommunications. Cables 110 and 112 are respectively connected to ports P1 and P2 of coupler $SC_1$. In accordance with one aspect of the operation of the inventive signal coupler, coupler $SC_1$ combines the signals present on the CATV and telephone cables to form a composite signal including both the CATV and telephone signals. The circuitry included within the signal coupler for performing this function is described in greater detail below.

In the illustrated embodiment, the composite signal provided on port P3 of coupler $SC_1$ is applied to a bidirectional splitter 120 via a 75 ohm coaxial cable 122. Splitter 120 operates to split the single composite signal applied thereto into three composite signals identical to one another and, except for attenuation, to the signal provided by coupler $SC_1$. Coaxial cables 124, 126, and 128 are connected to splitter 120 to receive the three composite signals. Splitter 120 can be provided as a power passing splitter such as manufactured by RMS Electronics of Hasbrouck Heights, N.J.

Coaxial cable 124 is routed to area 104 of dwelling 100 where it is connected to port P3 of coupler SC2. In accordance with another aspect of the operation of the present invention, coupler $SC_2$ separates the composite signal received on cable 124 and provides the separate CATV and telephone signals included in the composite signal on ports P1 and P2, respectively. Ports P1 and P2 of coupler SC are respectively connected to a converter device 130 via a 75 ohm coaxial cable 132 and a telephone cable 134.

Converter device 130 is associated with the viewing of television 136 and controls an impulse pay-per-view (p-p-v) function such as described above. Converter 130 includes circuitry for selectively passing a predetermined frequency of the CATV signal to television 136 and further includes circuitry for seizing the telephone line provided via telephone cable 134 (assuming the line is not otherwise in use), dialing a predetermined telephone number and communicating over the completed telephone connection. In the illustrated embodiment, dialing the predetermined telephone number would connect the converter box to the central computer system associated with the cable service provider. The converter would dial this telephone number in response to a signal received from the central computer on the CATV cable and, via the telephone connection, communicate to the computer system the viewer's identity for the purpose of billing the viewer for broadcast of a particular p-p-v feature. A button 140, or any other suitable actuating device, is provided on converter 130 for actuation by the television viewer to indicate the viewer's desire to have the particular p-p-v feature broadcast on television 136. For example, the user may be prompted as to when to actuate button 140 by instructions broadcast on a CATV channel dedicated to p-p-v broadcasts.

Thus, coupler $SC_2$ enables bidirectional telephone communication by converter 130 over telephone line 112 while simultaneously providing an RF signal, on port P1, for broadcast on television 136. That is, coupler $SC_2$ operates to separate the RF and telephone signals included in the composite signal and also operates to transmit on port P3 as part of the composite signal the telephone communications originated by converter 130. The transmitted telephone communications are conducted as part of the composite signal via bidirectional splitter 120 to coupler $SC_1$ which separates the telephone signal from the composite signal and provides it on port P2 thereof. As a result, couplers $SC_1$ and $SC_2$, via splitter 120, enable bidirectional telecommunication over cables 122 and 124 simultaneously with the transmission of RF CATV signals, to converter 130, over the same cable conductors. As can be seen, the use of couplers $SC_1$ and $SC_2$ eliminates the need to route a separate telephone cable to the proximity of converter 130. Installation is accomplished simply by connnecting coupler $SC_2$ between cable 124 and converter 130.

Still referring to FIG. 1, cable 126 for splitter 120 is connected to coupler $SC_3$ in area 106 of dwelling 100. For illustrative purposes, it is assumed there is no television requiring reception of CATV signals in area 106. Area 106 does, however, require connection to telephone line 112 provided for dwelling 100. Telecommunication over line 112 is available via port P2 of coupler $SC_3$. This is diagrammatically illustrated in FIG. 1 by connection of a telephone 150 to port P2 of coupler $SC_3$ via a telephone cable 152. Thus, bidirectional telecommunication between telephone 150 and line 112 is included in the composite signal conducted over cables 126 and 122 via couplers $SC_1$ and $SC_3$. As a result, provision of coupler $SC_3$ in area 106 of dwelling 100 enables provision of telephone service into that area without the need to route a dedicated telephone line to that area. Telephone service can be provided in any area of dwelling 100 into which a cable carrying the composite signal is routed. It is noted that if a television requiring reception of CATV signals were installed in area 106, that television could receive the required CATV signals simply by connection to port P1 (not shown) of coupler SC₃.

Cable 128 from splitter 120 is connected to coupler SC₄ in area 108 of dwelling 100. For illustrative purposes, it is assumed that area 108 includes a television 160 requiring reception of CATV signals. As seen in FIG. 1, CATV signals are provided to television 160 by connecting an appropriate RF input port of the television to port P1 of coupler SC₄ via a coaxial cable 162. Thus, coupler SC₄ receives the composite signal on port P3 but separates the RF CATV signal therefrom and provides that RF signal on port P1. It is noted that if it were desired to provide a telephone extension in area 108, it would only be necessary to connect the extension telephone to port P2 (not shown) of coupler SC₄.

Thus, in accordance with the illustrated embodiment, it is seen that upon formation of the composite signal by coupler SC₁, telephone and/or CATV service can be made available in any other area of dwelling 100 simply by routing a coaxial cable connected, directly or via splitter, to port P3 of coupler SC₁ and providing an additional signal conditioning unit in the other area to separate the CATV and telephone signals.

It is noted that while in FIG. 1 coupler SC₁ is illustrated as connected to incoming telephone service line 112 in order to form the composite signal, the invention is not so limited. A signal coupler can be provided in any area where it is possible to connect both telephone and CATV lines to the coupler. As a result, in an existing dwelling having both telephone and CATV service, a signal coupler could be installed in a room where connection to CATV and telephone lines can be made with minimum difficulties in installation. Then, by cable connection to port P3 of the signal coupler, telephone and/or CATV service can be routed to any other location in the dwelling. Further, while for the purpose of illustration, a broad application of the inventive signal coupler has been described, the coupler could simply be applied for the limited purpose of enabling practice of the impulse p-p-v feature in the manner described above. Such a limited application would be represented in FIG. 1 by deletion of splitter 120 and directly routing cable 122 to coupler SC₂. It would, of course, be assumed in such a situation that telephone service for other areas of the dwelling is otherwise provided by dedicated connections to line 112 in the conventional manner.

Figure 2:
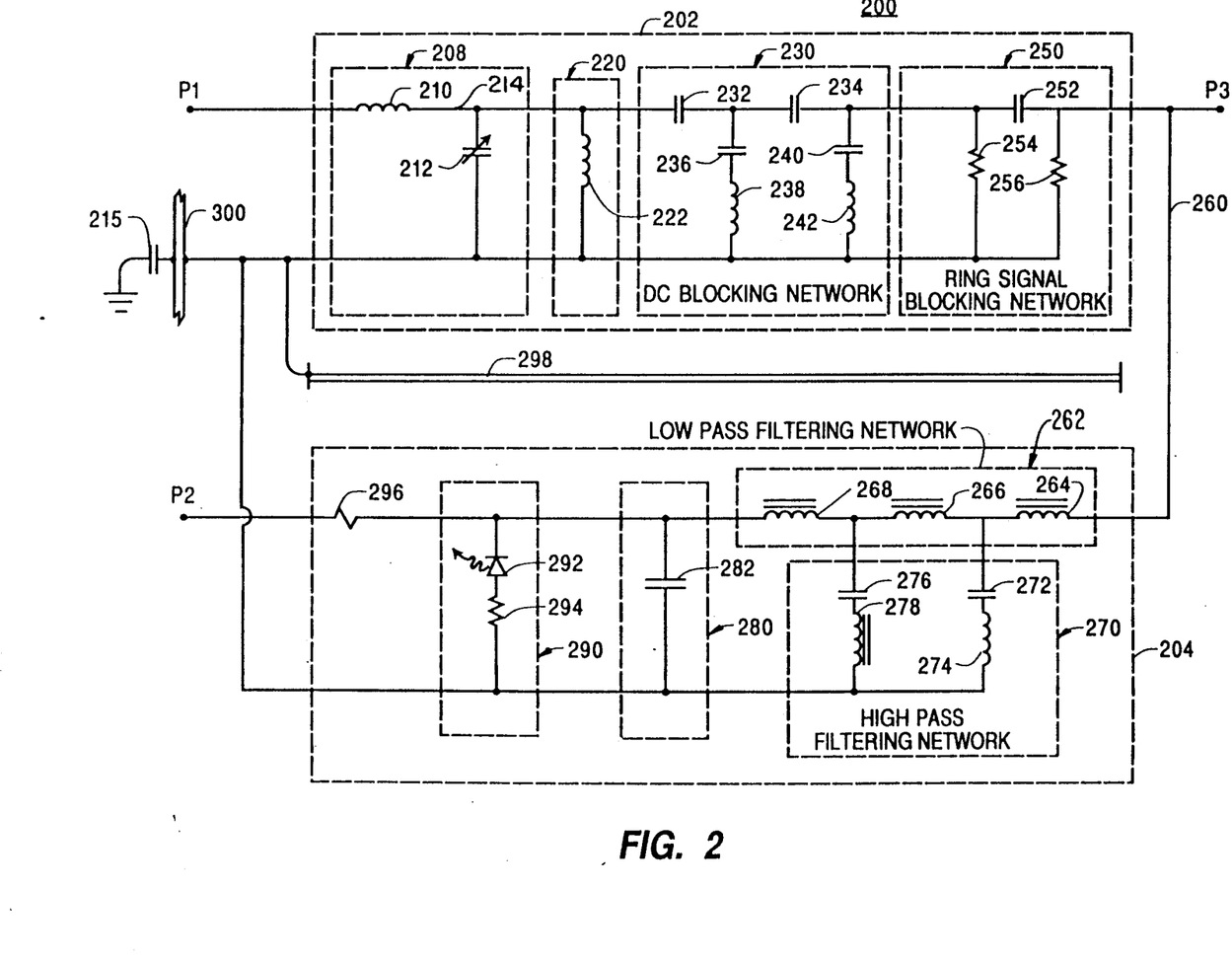
FIG. 2 illustrates a preferred configuration for the signal coupling device of the present invention.

FIG. 2 illustrates a circuit 200 embodying a preferred construction of the circuitry comprising the signal coupler of the present invention. Circuit 200 of the illustrated embodiment is configured to transmit and receive RF CATV signals in the range from 50 MHz to 550 MHz on port P1 and transmit and receive on port P2 telephone signals that range in frequency from DC to 4 kHz, have voltage levels ranging from 6 volts during an off-hook condition to 48 volts during an on-hook condition and periodically include a 20 Hz/90 volt AC ring voltage. Port P3 transmits and receives combined RF and telephone signals. It is noted that conventional CATV signals are only transmitted at frequencies at and above 50 MHz. Frequencies below 50 MHz are allocated for non-CATV applications. In general, circuit 200 serves to isolate RF port P1 from telephone signals present on ports P2 and P3, isolate telephone signal port P2 from RF signals present on ports P1 and P3 and assure flat frequency response characteristics for both the R and telephone signals transmitted and received by circuit 200.

Circuit 200 includes bidirectional ports P1, P2 and P3 described above for transmitting and receiving CATV, telephone and composite signals, respectively. A circuit portion 202 is coupled between ports P1 and P3, and a circuit portion 204 is coupled between ports P2 and P3. The signal coupler of the present invention includes bidirectional means operatively coupled between the RF, telephone and composite signal ports. As embodied herein, the bidirectional means is essentially provided as the elements of circuit 200 coupled between ports P1, P2 and P3. The bidirectional means includes high frequency signal trimming means. As embodied herein, the trimming means is provided in circuit 200 as a trimming network 208 that includes an inductor 210 in series with port P1 and a variable capacitor 212 connected between a branch 214 of circuit 200 and a reference voltage point. The values of inductor 210 and capacitor 212 are selected/adjusted so that the trimming means filters the RF signal being transmitted by circuit 200 on the port P1 to provide a flat frequency response above 50 MHz.

In the illustrated embodiment, the connection of circuit elements to the reference voltage point is made by connection to a wall of a sheet metal enclosure 300 (FIG. 3) that houses circuit 200. Enclosure 300 is in turn connected to ground through a capacitor 215 to provide a grounding arrangement that is described in greater detail below. For simplicity of explanation, the connections of elements of circuit 200 to the reference voltage point will be referred to as connections to ground.

Circuit 200 further includes an element 220, as an inductor 222, for providing low frequency continuity to ground. Thus, inductor 222 is connected between branch 214 and ground. Element 220 is primarily provided as a path to ground for low frequency signal components received with the RF signals on port P1.

The signal coupler of the present invention also includes first isolating means for isolating the RF port from telephone signals. The first isolating means comprises telephone signal blocking means which is embodied herein as a DC blocking network 230, connected to branch 214, that includes two series connected capacitors 232 and 234 and a first low pass path to ground, tapped between capacitors 232 and 234 and formed by capacitor 236 and inductor 238. Network 230 further includes a second low pass path to ground formed by capacitor 240 and inductor 242. Series capacitors 232 and 234 are provided to block the DC component of telephone signals present on ports P2 and P3 from passing to port P1. The first and second low pass paths to ground each provide a path to ground for signals having a frequency below 50 MHz. It is preferred herein that two separate low pass paths to ground be provided and that series capacitor 234 be interposed between those two paths in order to more effectively isolate RF port P1 from telephone signals.

The first isolating means further comprises ring signal blocking means. As embodied herein, and still referring to FIG. 2, the ring signal blocking means is provided as a ring signal blocking network 250 comprising capacitor 252 and resistors 254 and 256 shunt connected to ground respectively on either side of capacitor 252. The values of capacitor 252 and resistors 254 and 256 are preferably selected to form a high pass circuit effective to cut-off signals at frequencies of 50 Hz and less. The 50 Hz cut-off is preferred in order to provide a margin above the 20 Hz telephone ring signal. Capacitor 252 also acts as a high pass device rejecting the low frequency AC components of the telephone signal.

A branch 260 of circuit 200 is tapped at a point between blocking network 250 and port P3. The signal coupler of the present invention further includes low pass filter means. As embodied herein, the low pass filter means is provided as a low pass filtering network 262, connected at one end to branch 260 of circuit 200, comprising inductors 264, 266 and 268. As illustrated in FIG. 2, these inductors are preferably provided as toroidal core inductors. Network 262 is provided for filtering the telephone signals being transmitted by circuit 200 on port P2 and ensuring that the frequency characteristics of those signals remain level and flat.

The signal coupler of the present invention additionally includes second isolating means for isolating the telephone signal port from RF signals. As embodied herein, the second isolating means is provided as a high pass filtering network 270 comprising a first high pass path to ground tapped between inductors 264 and 266 and formed by capacitor 272 and inductor 274. Network 270 further includes a second high pass path to ground tapped between inductors 266 and 268 and formed by capacitor 276 and inductor 278. The first and second high pass paths to ground are provided to isolate port P2 from RF signals present on ports P1 and P3. That is, network 270 serves as means for blocking the passage of RF signals to port P2. It is preferred that the first high pass path to ground conduct signals having a frequency equal to or greater than 10 MHz and that the second high pass path to ground conduct signals having a frequency equal to or greater than 30 MHz. As seen in FIG. 2, it is further preferred that inductor 278 be provided as a toroidal core inductor.

Circuit 200 includes an element 280, as a capacitor 282, for providing an additional high pass path to ground. Element 280 is included in circuit 200 primarily for providing a path to ground for RF signal components received with the telephone signals on port P2.

While not required for the practice of the present invention, it is preferred herein that an indicating network 290 be provided. Network 290 consists of a light emitting diode 292 and a resistor 294. Resistor 294 is selected so that diode 292 just turns on when the 48 volt on-hook condition exists on the telephone line. With the value of resistor 294 so selected, the diode is effectively unloaded from the circuit when the telephone line is at the low voltage state corresponding to the off-hook condition. The light emitted by diode 292 serves to indicate continuity on the telephone circuit. A further feature of circuit 200 that is preferred but not required for practice of the present invention is provision of a fuse 296 in series with port P2. The fuse is provided to protect against a short circuit occurring on or beyond port P3.

Circuit 200 additionally includes a metal shield barrier 298 connected to ground (i.e., connected to the metal enclosure in the illustrated embodiment) and provided to prevent electromagnetic interference between the circuit elements of circuit portion 202 and the circuit elements of circuit portion 204.

Figure 3:
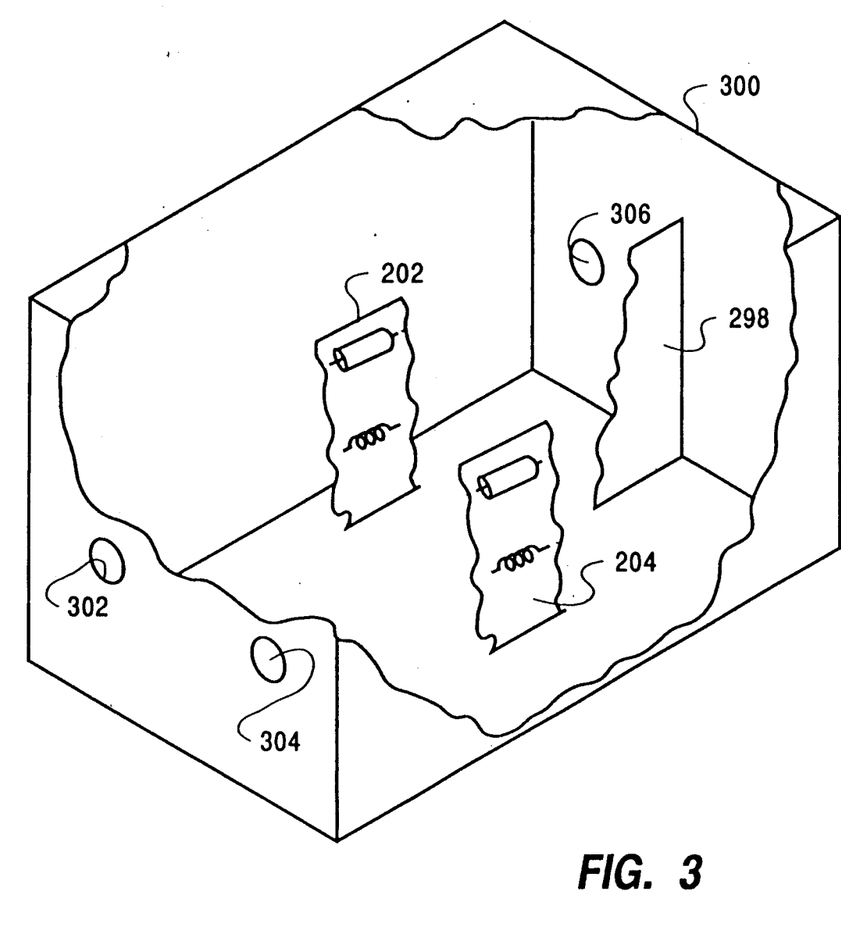
FIG. 3 illustrates a broken away view of an enclosure for housing circuitry of the present invention.

Referring to FIG. 3, circuit 200 is preferably housed in metal enclosure 300, made of 14 or 16 gauge sheet steel, that can have the form of a rectangular box. Enclosure 300 is illustrated as partially broken away in order to show the relative positioning of circuit portions 202 and 204 and shield barrier 298 therein. Enclosure 300 also includes holes 302, 304 and 306 to enable connection to ports P1, P2 and P3, respectively, of circuit 200.

As previously described, the CATV cable connected to port P1 of circuit 200 is a coaxial cable. The center conductor of that coaxial cable is connected to port P1. The shield of the cable is connected to the metal enclosure housing circuit 200 through capacitor 215. In the illustrated embodiment, capacitor 215 has a value of 8 $\mu$F. It is noted that it is typical practice for the cable service provider to remotely ground the shield of the CATV cable, e.g., at a point just prior to entry into the viewer's dwelling. The metal enclosure is thus grounded by its connection, through capacitor 215, to the cable shield. Capacitor 215 is provided to block DC continuity to the CATV cable shield connection to ground in order to meet FCC grounding requirements for telephone circuits. Also, as indicated above, a coaxial cable is connected to port P3 of circuit 200 to carry the composite signal. While the center conductor of the coaxial cable is connected to port P3, the shield of this cable is connected to the metal enclosure. The typical two conductor telephone cable consists of a positive and negative conductor. It is preferred herein that the negative conductor be connected to port P2 of circuit 200, while the positive conductor is connected to the ground for the circuit (i.e., the metal enclosure in the illustrated embodiment).

Without limitation and according to one actual reduction to practice, circuit 200 may be constructed with circuit components having the values listed in Table I below:

TABLE I

| | | | |
|---|---|---|---|
| Resistor 254 | = | 75M ohms | |
| Resistor 256 | = | 75M ohms | |
| Resistor 294 | = | 47K ohms | |
| Inductor 210 | = | 5 nH | (air core) |
| Inductor 222 | = | 850 nH | (") |
| Inductor 238 | = | 900 nH | (") |
| Inductor 242 | = | 750 nH | (") |
| Inductor 264 | = | 750 nH | (") |
| Inductor 264 | = | 750 nH | (toroidal core) |
| Inductor 266 | = | 750 nH | (") |
| Inductor 268 | = | 550 nH | (") |
| Inductor 274 | = | 400 nH | (air core) |
| Inductor 278 | = | 500 nH | (toroidal core) |
| Capacitor 212 | = | 2–20 pF | (adjustable range) |
| Capacitor 215 | = | 8 $\mu$F | |
| Capacitor 232 | = | 38 pF | |
| Capacitor 234 | = | 38 pF | |
| Capacitor 236 | = | 100 pF | |
| Capacitor 240 | = | 160 pF | |
| Capacitor 252 | = | 38 pF | |
| Capacitor 272 | = | 73 pF | |
| Capacitor 276 | = | 47 pF | |
| Capacitor 280 | = | 35 pF | |
| Diode 292 | = | ECG3130 | |
| Fuse 296 | = | ¼ amp | |

The circuit element values listed in Table I provide for transmission of RF signals of up to 450 MHz. It is noted, however, that some CATV systems operate at frequencies of up to 550 MHz. It is within the skill of the art, as supplemented by the teachings herein, to select circuit element values for the inventive signal coupler to accommodate CATV signals of up to 550 MHz.

While the typical telephone signals described above are characteristic of voice communication signals, the signal coupler of the present invention can also receive and transmit digital data signals carried by the telephone lines. For example, data communication at a rate of 2400 baud can be received and transmitted by the inventive signal coupler. Also, while the inventive signal coupler has been described as being coupled to receive CATV signals over a 75 ohm coaxial cable, port P1 of the signal coupler can instead be connected to receive, e.g., via 300 ohm twin lead flat cable, TV signals such as received by a conventional TV antenna.

Thus, it is intended that the present invention cover the modifications and variations of this invention provided they come within the scope of the appended claims and their equivalents.

I claim:

1. Signal coupling apparatus, comprising:
   a radio frequency (RF) signal port for at least one of transmitting and receiving RF signals;
   a bidirectional telephone signal port;
   a bidirectional composite signal port for transmitting and receiving composite signals including telephone and RF signals; and
   bidirectional means, operatively coupled between said RF signal port, telephone signal port and composite signal port, for providing on said composite signal port a composite signal including RF and telephone signals respectively present on said RF and telephone signal ports and for respectively providing, on said RF and telephone signal ports, RF and telephone signals that are included in a composite signal present on said composite signal port.

2. The signal coupling apparatus of claim 1, said bidirectional means including:
   first means for isolating said RF signal port from telephone signals present on said telephone signal port and said composite signal port; and
   second means for isolating said telephone signal port from RF signals present on said RF signal port and said composite port.

3. The signal coupling apparatus of claim 2, said first isolating means including:
   telephone signal blocking means for blocking DC signal components and for providing a low frequency signal path to ground; and
   ring signal blocking means for blocking a telephone ring signal.

4. The signal coupling apparatus of claim 2, said second isolating means including a high frequency signal path to ground.

5. The signal coupling apparatus of claim 2, said first isolating means including:
   telephone signal blocking means for blocking DC signal components and for providing a low frequency path to ground; and
   ring signal blocking means for blocking a telephone ring signal; and
   said second isolation means including a high frequency signal path to ground.

6. The signal coupling apparatus of claim 5 further including high frequency signal trimming means for filtering RF signals, received on said composite signal port, to provide a flat frequency characteristic prior to providing the received RF signals on said RF signal port; and
   low pass filtering means for filtering telephone signals, received on said composite signal port, to provide a flat frequency characteristic prior to providing the received telephone signals on said telephone signal port.

7. Signal coupling apparatus, comprising:
   a cable television (CATV) signal port for at least one of transmitting and receiving CATV signals;
   a bidirectional telephone signal port for transmitting and receiving telephone signals;
   a bidirectional composite signal port for transmitting and receiving a composite signal including CATV and telephone signals; and
   bidirectional means, operatively coupled between said CATV signal port, telephone signal port and composite signal port, for providing on said composite signal port a composite signal including CATV and telephone signals respectively present on said CATV and telephone signal ports and for respectively providing, on said CATV and telephone signal ports, the CATV and telephone signals that are included in a composite signal present on said composite signal port.

8. The signal coupling apparatus of claim 7, said bidirectional means including:
   first means for isolating said CATV signal port from telephone signals present on said telephone signal port and said composite signal port; and
   second means for isolating said telephone signal port from CATV signals present on said CATV signal port and said composite signal port.

9. The signal coupling apparatus of claim 8 wherein the CATV signals are in a frequency range of from 50 MHz to 550 MHz; and
   the telephone signals having a frequency range of from DC to 4 kHz.

10. The signal coupling apparatus of claim 8, said first isolating means including:
    a telephone signal blocking network for blocking DC signal components and for providing a low frequency path to ground; an
    a ring signal blocking network for blocking a telephone ring signal.

11. The signal coupling apparatus of claim 8, said second isolating means including a high frequency signal path to ground.

12. The signal coupling apparatus of claim 8, said first isolating means including:
    a telephone signal blocking network for blocking DC signal components and for providing a low frequency path to ground; and
    a ring signal blocking network for blocking a telephone ring signal; and
    said second isolating means including a high frequency signal path to ground.

13. The signal coupling apparatus of claim 12 further including a high frequency signal trimming network for filtering CATV signals, received on said composite signal port, to provide a flat frequency characteristic prior to providing the received CATV signals on said CATV signal port; and
    a low pass filtering network for filtering telephone signals, received on said composite signal port, to provide a flat frequency characteristic prior to providing the received telephone signals on said telephone signal port.

14. The signal coupling apparatus of claim 13 further including means for providing a path to ground for DC signal components received with CATV signals on said CATV signal port.

15. A coupling device for communicating television (TV) and telephone signals over a common line, comprising:

a housing having a TV input/output (i/o) port means for being removably connected to a first conductor, a telephone i/o port means for being removably connected to a second conductor, and a composite TV/telephone i/o port means for being removably connected to a third conductor;

first circuit means mounted in the housing and electrically coupling the TV port means to the composite port means for passing television signals over connected first and third conductors;

the first circuit means including means for blocking the passage of telephone signals between the TV port means and the composite port means;

second circuit means mounted in the housing and electrically coupling the telephone port means to the composite port means for passing telephone signals over connected second and third conductors; and the second circuit means including means for blocking the passage of television signals between the telephone port means and the composite port means.

16. The coupling device of claim 15, said telephone signal blocking means including:
means for blocking DC signal components and for providing a low frequency signal path to ground; and
means for blocking a telephone ring signal.

17. The coupling device of claim 15, said TV signal blocking means including a high frequency signal path to ground.

18. The coupling device of claim 15, said telephone signal blocking means including:
means for blocking DC signal components and for providing a low frequency pass to ground; and
means for blocking a telephone ring signal; and
said TV signal blocking means including a high frequency signal path to ground.

19. The coupling device of claim 18 further including high frequency signal trimming means for filtering TV signals, received on said composite port means, to provide a flat frequency characteristic prior to providing the received TV signals on said TV port means; and
low pass filtering means for filtering telephone signals, received on said composite port means, to provide a flat frequency characteristic prior to providing the received telephone signals on said telephone port means.

20. The coupling device of claim 15 wherein said housing is composed of metal;
said first and third conductors each being a coaxial cable; and
a shield of said first conductor and a shield of said third conductor being connected to said housing.

21. Signal coupling apparatus, comprising:
a cable television (CATV) signal port for at least one of transmitting and receiving CATV signals;
a bidirectional telephone signal port for transmitting and receiving telephone signals;
a bidirectional composite signal port for transmitting and receiving a composite signal including CATV and telephone signals;
bidirectional means, operatively coupled between said CATV signal port, telephone signal port and composite signal port, for providing on said composite signal port a composite signal including CATV and telephone signals respectively present on said CATV and telephone signal ports and for respectively providing, on said CATV and telephone signal ports, the CATV and telephone signals that are included in a composite signal present on said composite port;

said bidirectional means including first isolating means for isolating said CATV signal port from telephone signals present on said telephone signal port and said composite signal port, said first isolating means including:
a telephone signal blocking network for blocking DC signal components and for providing a low frequency signal path to ground; and
a ring signal blocking network for blocking a telephone ring signal;

said bidirectional means including second isolating means for isolating said telephone signal port from CATV signals present on said CATV signal port and said composite signal port, said second isolating means including a high frequency signal path to ground;

a high frequency signal trimming network for filtering CATV signals, received on said composite signal port, to provide the received CATV signals with a flat frequency characteristic on said CATV signal port;

a low pass filtering network for filtering telephone signals, received on said composite signal port, to provide the received telephone signals with a flat frequency characteristic on said telephone signal port;

means for providing a path to ground for DC signal components received with CATV signals on said CATV signal port; and means for indicating when a telephone line coupled to said telephone signal port is in an on-hook condition.

22. A system for receiving, in a dwelling having an incoming telephone line, pay-per-view programs over an incoming CATV cable, comprising:
a television receiver;
a converter operatively connected to the television receiver for permitting reception of a pay-per-view program in response to a user selection and including a first terminal for operative connection to a telephone line for transmitting the user selection to a central station, and a second terminal for operative connection to the CATV cable;
a first and a second signal coupler each including
a radio frequency (RF) signal port for at least one of transmitting and receiving RF signals,
a bidirectional telephone signal port,
a bidirectional composite signal port for transmitting and receiving composite signals including telephone and RF signals, and
bidirectional means, operatively coupled between said RF signal port, telephone signal port and composite signal port, for providing on said composite signal port a composite signal including RF and telephone signals respectively present on said RF and telephone signal ports and for respectively providing, on said RF and telephone signal ports, RF and telephone signals that are included in a composite signal present on said composite signal port,
the bidirectional telephone signal port of the first coupler being coupled to the incoming telephone line;

the RF port of the first coupler being connected to the incoming CATV cable;

the composite port of the first coupler being connected to the composite port of the second coupler;

the first terminal of the converter being connected to the bidirectional telephone signal port of the second coupler; and the second terminal of the converter being connected to the RF signal port of the second coupler.

23. The system of claim 22 wherein the bidirectional means of each said first and second signal coupler includes:

first means for isolating said RF signal port from telephone signals present on said telephone signal port and said composite signal port; and second means for isolating said telephone signal port from RF signals present on said RF signal port and said composite port.

24. The system of claim 23 wherein said first isolating means includes:

telephone signal blocking means for blocking DC signal components and for providing a low frequency signal path to ground; and ring signal blocking means for blocking a telephone ring signal.

25. The system of claim 23 wherein said second isolating means includes a high frequency signal path to ground.

26. The system of claim 23 wherein said first isolating means includes:

telephone signal blocking means for blocking DC signal components and for providing a low frequency signal path to ground; and ring signal blocking means for blocking a telephone ring signal; and said second isolation means including a high frequency signal path to ground.

27. The system of claim 26 wherein each said first and second signal coupler includes high frequency signal trimming means for filtering RF signals, received on said composite signal port, to provide a flat frequency characteristic prior to providing the received RF signals on said RF signal port; and low pass filtering means for filtering telephone signals, received on said composite signal port, to provide a flat frequency characteristic prior to providing the received telephone signals on said telephone signal port.

* * * * *